United States Patent [19]

Liao

[11] Patent Number: 5,551,744
[45] Date of Patent: Sep. 3, 1996

[54] MOTOR VEHICLE WINDSHIELD CURTAIN STRUCTURE

[75] Inventor: Chuen-Rong Liao, Taichung City, Taiwan

[73] Assignee: Energy Conservation Partnership, Ltd., Boulder, Colo.

[21] Appl. No.: 371,974

[22] Filed: Jan. 12, 1995

[51] Int. Cl.$^6$ ............................................. B60J 3/02
[52] U.S. Cl. ................... 296/97.4; 296/97.8; 296/141; 160/370.22
[58] Field of Search ................... 296/97.1, 97.4, 296/97.8, 140, 141, 143; 160/DIG. 2, DIG.3, 370.21, 370.22, 270, 271, 272, 273.1, 313, 314

[56] References Cited

U.S. PATENT DOCUMENTS

| | | | |
|---|---|---|---|
| 1,931,438 | 10/1933 | Hitz | 296/97.4 |
| 4,758,041 | 7/1988 | Labeur | 296/97.8 |
| 5,058,473 | 2/1992 | Yang | 296/97.4 |
| 5,201,563 | 4/1993 | Liao | 296/97.4 |

FOREIGN PATENT DOCUMENTS

| | | | |
|---|---|---|---|
| 3413966 | 10/1985 | Germany | 296/97.4 |
| 3415930 | 10/1985 | Germany | 296/97.4 |

*Primary Examiner*—Dean Kramer
*Attorney, Agent, or Firm*—Pennie & Edmonds

[57] ABSTRACT

A windshield assembly for a curtain motor vehicle includes a windshield curtain, a furling casing, a power casing, a driving spring assembly and a revolving axle. The revolving axle, the speed of which is controlled, extends outside the power casing. The springs have opposite spiral directions and are connected to the ends of the revolving axle so as to rotate in the same direction. A link block is installed inside the spring and includes a link stick which extends outside an aperture of a sliding track within which the spring is located. The link sticks are connected to the bottom end of the windshield curtain. Thus, when the power casing is controlled to drive the revolving axle, the spring drives the link block to move upwards and downwards such that the windshield curtain is driven to move upwards or downwards. With this arrangement, the windshield curtain can be taken up, unreeled or stopped at arbitrary positions according to the operator's requirement and the objects of simply controlling and stably moving the windshield curtain are achieved.

4 Claims, 9 Drawing Sheets

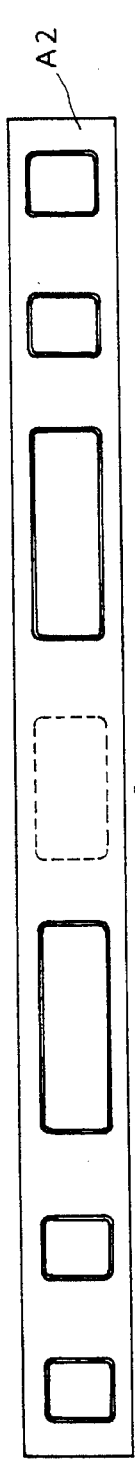
FIG 10A
FIG 10B
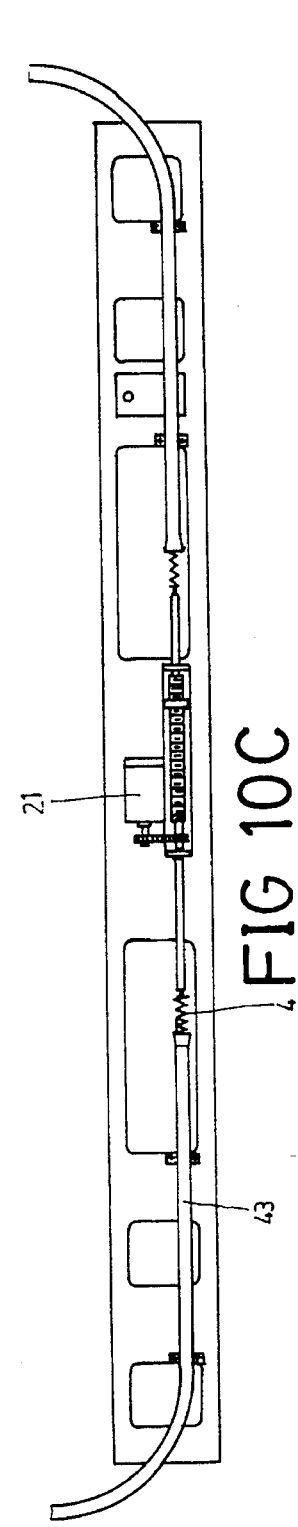
FIG 10C
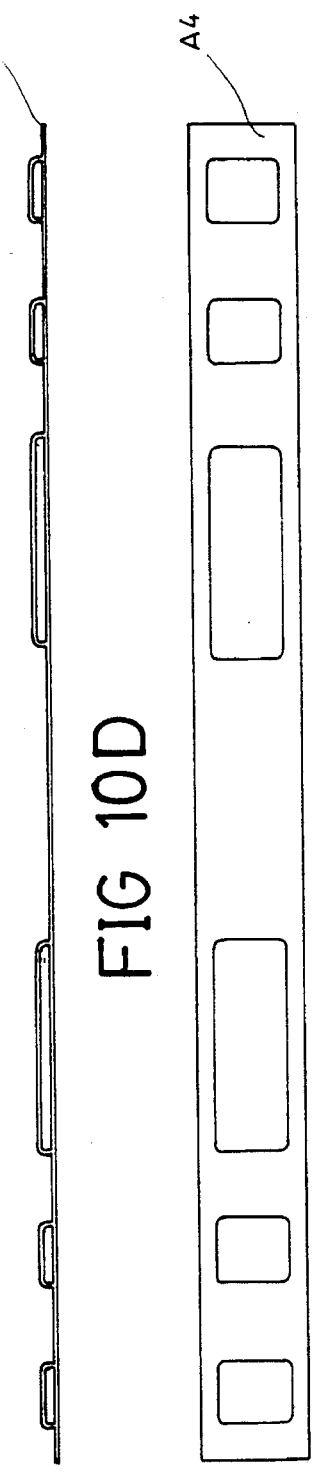
FIG 10D
FIG 10E

MOTOR VEHICLE WINDSHIELD CURTAIN STRUCTURE

BACKGROUND OF THE INVENTION

The use of a windshield curtain can be quite necessary in a motor vehicle. Various shielding devices are known and used in preventing sunlight from radiating into a motor vehicle, such as the commonly used heat insulator or a single axle rolling film. Varying the degree of shielding between different curtain portions is not provided by those common used devices. The heat insulator, for example, is not suitable for fixedly installing on the front window of the motor vehicle, because viewing would be obstructed by the deep color thereof.

The existence of many patents directed to windshield curtains in the world indicates that a plurality of designs in windshield curtains are available. For example: U.S. Pat. No. 1,755,734 discloses a spring means to control a curtain; U.S. Pat. No. 1,758,220 discloses a rope to draw up or let down a curtain; U.S. Pat. No. 1,762,480 discloses a drive means to drive a roller which lifts cables so as to control the position of a shield; U.S. Pat. No. 1,881,631 discloses an apparatus installed on the rear part of a motor vehicle; U.S. Pat. No. 1,931,438 discloses the use of gears and screws to move a shield into operation; U.S. Pat. No. 2,444,524 discloses a device slidably mounted on a frame; U.S. Pat. No. 4,149,749 discloses a frame having means for receiving and guiding visors that are movable between an inoperative, retracted position and an operative, extended position; U.S. Pat. No. 4,979,775 discloses the use of a winding shaft and a shade strip, which winding shaft is axially displaced when the strip is pulled past a window or wound back onto the shaft; German Patent No. 874,658 discloses a first frame that slides inside a second frame; German Patent No. 24,450,408, discloses a sliding structure; Japanese Patent No. 67621 discloses a reflecting panel that can be pulled out or pushed back into a housing container; and Japanese Patent No. 186425 discloses a bellows type sun visor that is reciprocated by means of the operation of a motor controlled by a photoreceptor sensor. Therefore, the aforesaid devices are different in structure and operation, but are commonly used in preventing sunlight or an illuminator from radiating into a motor vehicle.

The present invention has been accomplished for the same purpose. In Taiwan Patent No. 65139 a device called "A Windshield Curtain Structure Used in Motor Vehicle" is disclosed and in U.S. Pat. No. 5,201,563a structure called "Motor Vehicle Windshield Curtain Control" is disclosed. The inventor of the invention investigated continually and finally developed a windshield curtain which uses a new driving arrangement wherein the associated structure is quite different with the aforementioned applications, and the performance is better.

The main object of this invention is to provide a new windshield curtain used in a motor vehicle wherein a transversely revolving axle, the rolling speed of which is controlled, is extended outside the power casing installed inside the hollow roof beam of the motor vehicle, and springs that spiral in opposite directions are installed on both sides of the revolving axle. The elasticity of the springs extending inside the side racks of the front window is the power source to extend and take up the windshield curtain. With this arrangement, a stable and simple controlled curtain is provided. A link block with a link stick is installed inside the spring, and the link stick extends outside the sliding track where the spring is located on and into the aperture of the sliding groove. The rotation of the spring can drive the link block to move upwards and downwards when the power casing is driven to rotate the spring. Meanwhile, the link stick and the windshield curtain also move upwards and downwards. Owing to the characteristics that the spring is soft and can rotate stably when it is bent, the spring can be bent to a variant shape when it is extended downwards to the side rack from the power casing through the furling casing. With this arrangement, the objects of providing a simple installation and stably controlled system are achieved.

SUMMARY OF THE INVENTION

The motor vehicle windshield curtain structure includes a windshield curtain, a furling casing, a power casing, a spring device used for driving, etc., wherein the power casing and the furling casing are installed inside the hollow roof beam near the front window in advance, and the furling casing is located in front of the power casing in a preferred design. Inside the power casing, a driving motor, a regulator used to stop the curtain, and two revolving axles extending outside the power casing after a rolling speed is controlled by the adjusting gear are installed, and the spring used for driving is connected with the revolving axle. The revolving axles are coaxial and rotate in the same direction. The spiral orientation of the springs connected on both sides of the axles are opposite to each other for achieving both upward and downward rotation of the revolving axles. The springs extend to the bottom of the side rack near the front window through the furling casing and the sliding track of the side rack. A sliding block is installed on the end of each spring for increasing the rotating stability of the spring and decreasing operation noise. A link block with a link stick is engaged inside the spring with the link stick extending outside the spring into an aperture of the sliding groove from top to bottom and facing the front window. The link sticks are connected to both sides of the windshield curtain. The rotation of the spring can force the link block to move when the power casing rotates the spring. The link stick of the link block is limited by the aperture of the sliding groove on the sliding track, so that the link block can only move upwards or downwards. Meanwhile, the windshield curtain connected to the link stick is driven to move upwards or downwards. Thus, the effect of stably controlling the curtain to move upwards and downwards is achieved.

BRIEF DESCRIPTION OF THE DRAWINGS

FIG. 10A is a top plan view of the crossbeam according to the invention;

FIG. 10B is a side elevational view of the crossbeam of FIG. 10A;

FIG. 10C illustrates the mounting of various components on the crossbeam of FIGS. 10A and 10B;

FIG. 10D is a side elevational view of a bottom crossbeam plate;

FIG. 10E is a top plan view of the bottom crossbeam plate of FIG. 10E; and

DETAIL DESCRIPTION OF THE PREFERRED EMBODIMENTS

Figure 1:
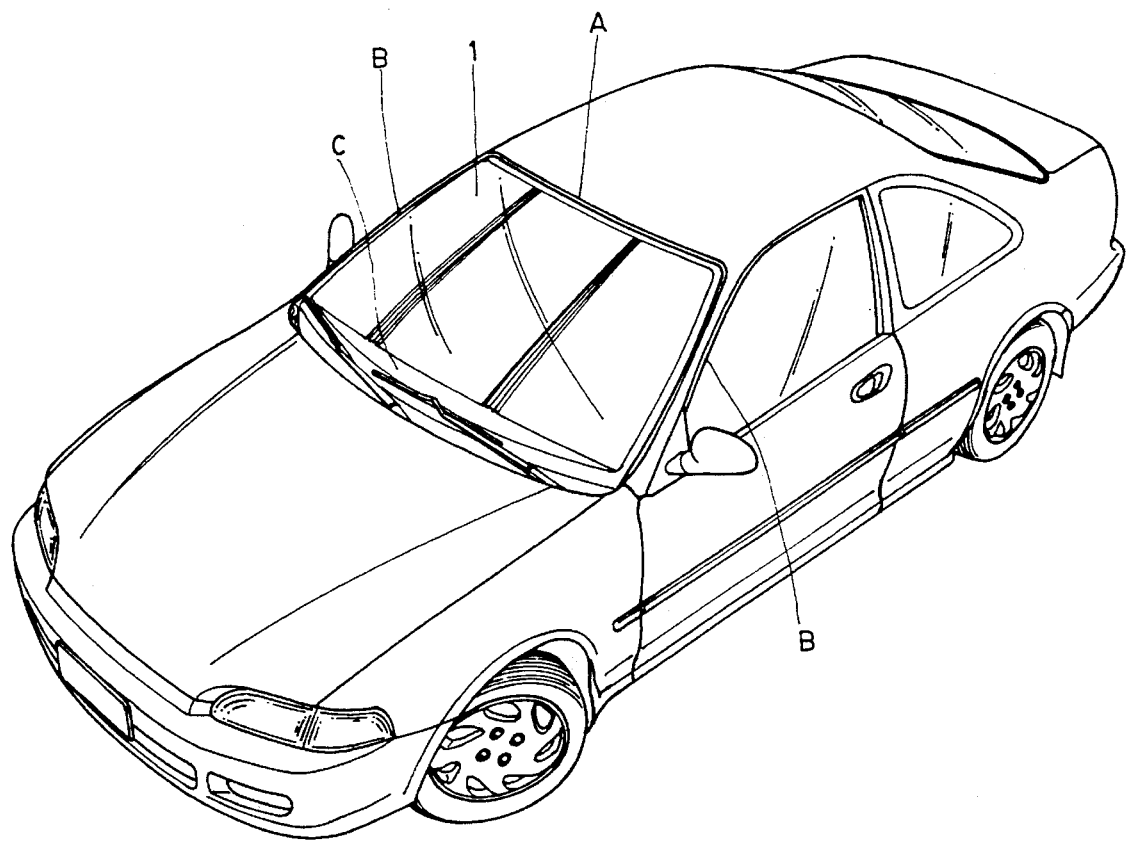
FIG. 1 shows the appearance of a motor vehicle having the curtain of the invention installed therein.
Figure 2:
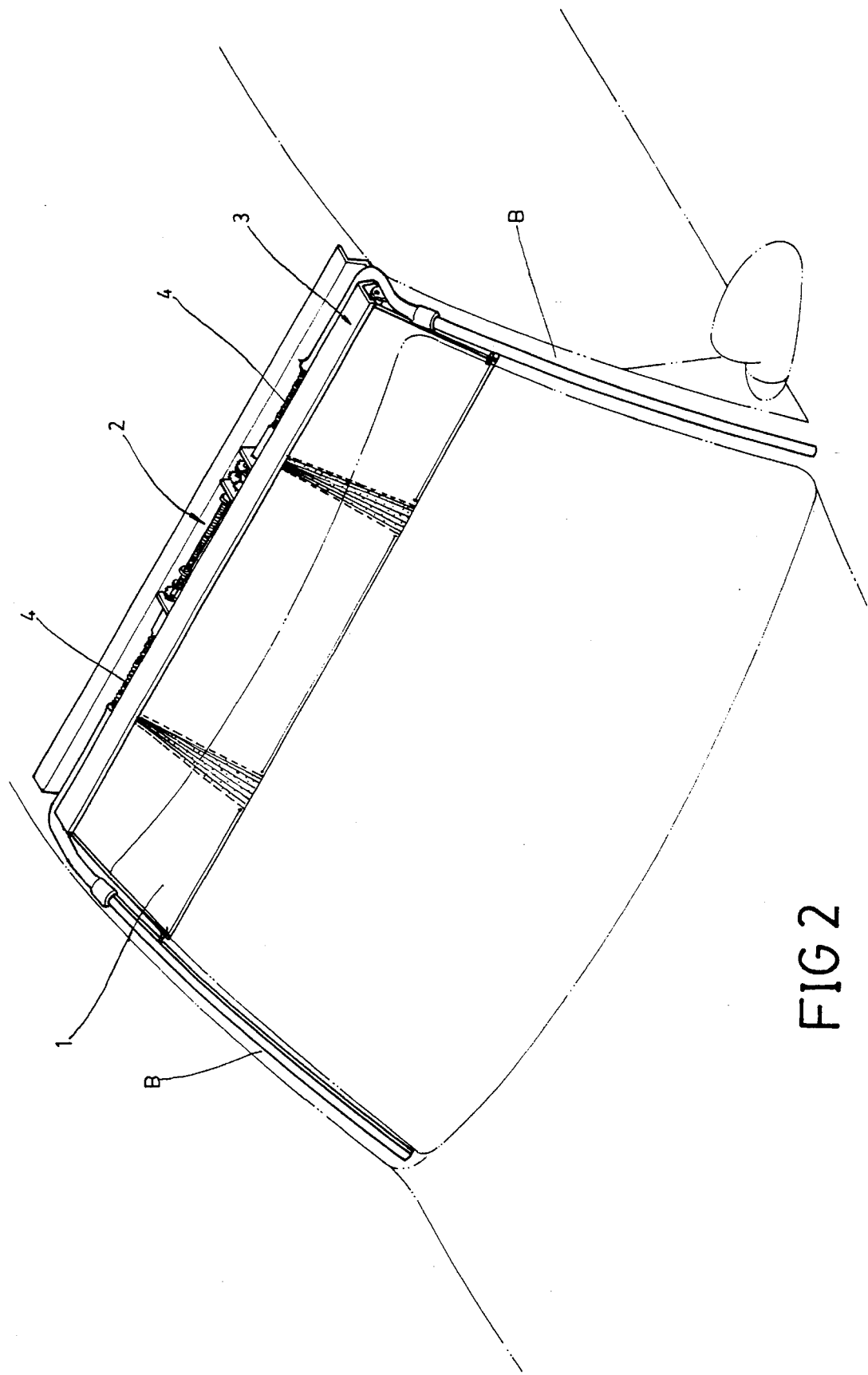
FIG. 2 is a perspective view of the internal structure of this invention.
Figure 3:
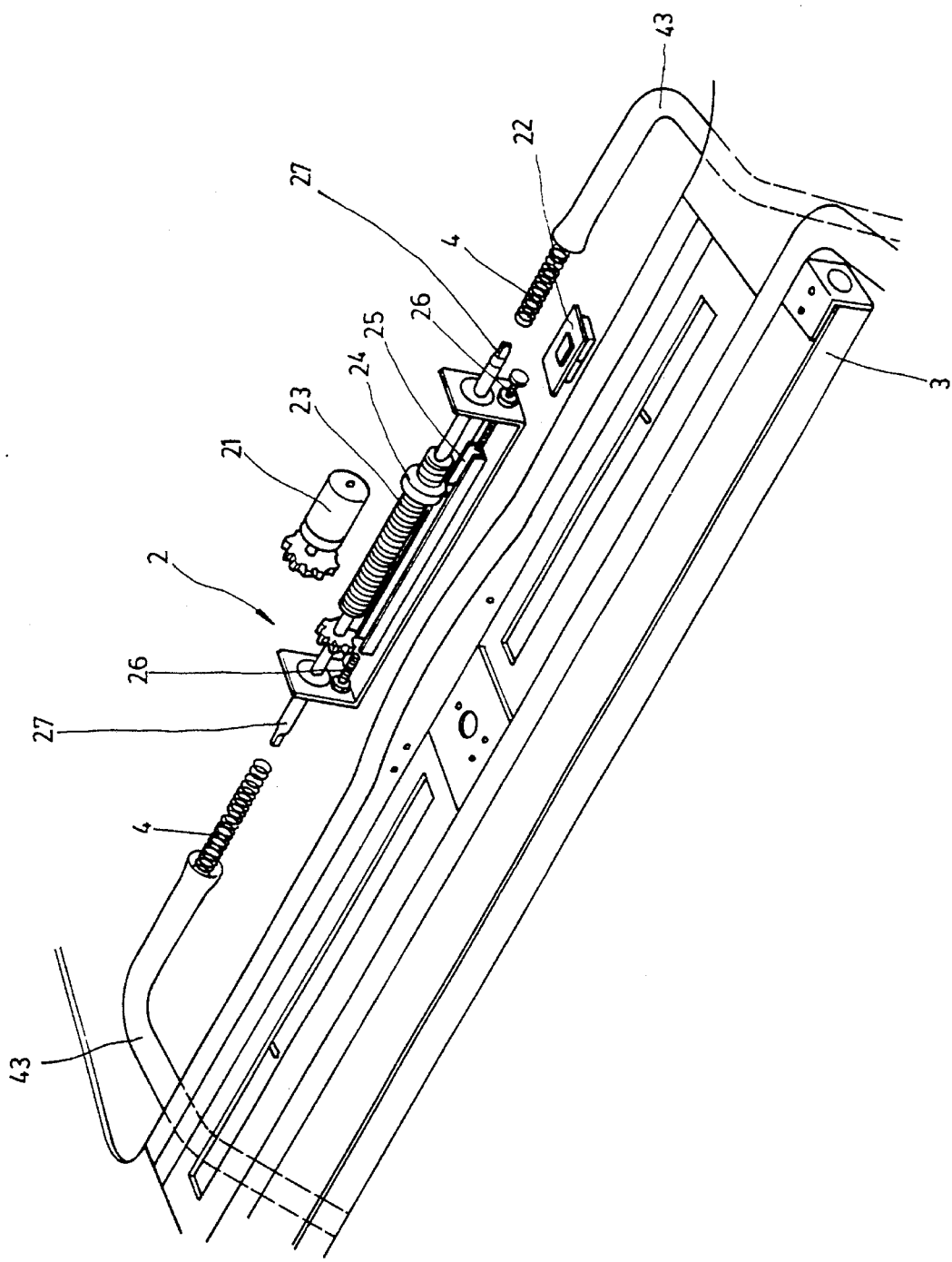
FIG. 3 is a partial exploded diagram indicating the components of the internal structure in accordance with this invention.

Referring to FIGS. 1, 2, 3 the components of the windshield curtain (1) of this invention are concealably installed into the crossbeam (A) and the side rack (B). The control for moving the curtain upwards and downwards is very simple, and the object of shielding a selected portion of the front window is achieved. The crossbeam (A) evinces a curved shape and is installed on the top of the front window (C) of the motor vehicle. The power casing, the furling casing, etc. can be arranged in the concave metal thereof, end the side rack (B) extends transversely from the crossbeam (A). The side rack (B) is connected to the crossbeam (A) and comprises a hollow metal member, and the driving component is inserted into the side rack (B) for taking up or unreeling the windshield curtain (1).

In general, this invention includes a windshield curtain (1), a power casing (2), a furling casing, and springs (4). Rotation is controlled by a motor (21) arranged in the power casing (2), and the rotating orientation of the motor (21) is controlled by a power control switch (22) installed in an operator accessible position. The windshield curtain (1) can be driven to move upwards or downwards, stop at the bottom of the front window or can be arbitrarily positioned by the electronic circuit and the associated structure in the power casing (2) or the alternative structure shown in FIG. 3. The movement of the windshield curtain (1) is accomplished by simple mechanical components in the structure of FIG. 3, such as the control rod (23), the locating nut (24) thereon, and a locating groove (25). The control rod (23) is driven to rotate in a clockwise or counterclockwise direction by the motor (21), and the locating nut (24) is engaged in the locating groove (25) so that the locating nut (24) can only move laterally. The terminals of movement of the locating nuts (24) are adjusted by the screws (26)installed on both sides of the locating groove (25). When the nut (24) engages the screw (26), the resistance can stop the motor for adjusting the stop position of taking up or unreeling the windshield curtain (1). This is an embodiment of simple design. The method of achieving the aforesaid movement is similar to that of an automatic window, so the object of controlling the windshield curtain is certainly satisfied by a plurality of designs.

Figure 4:
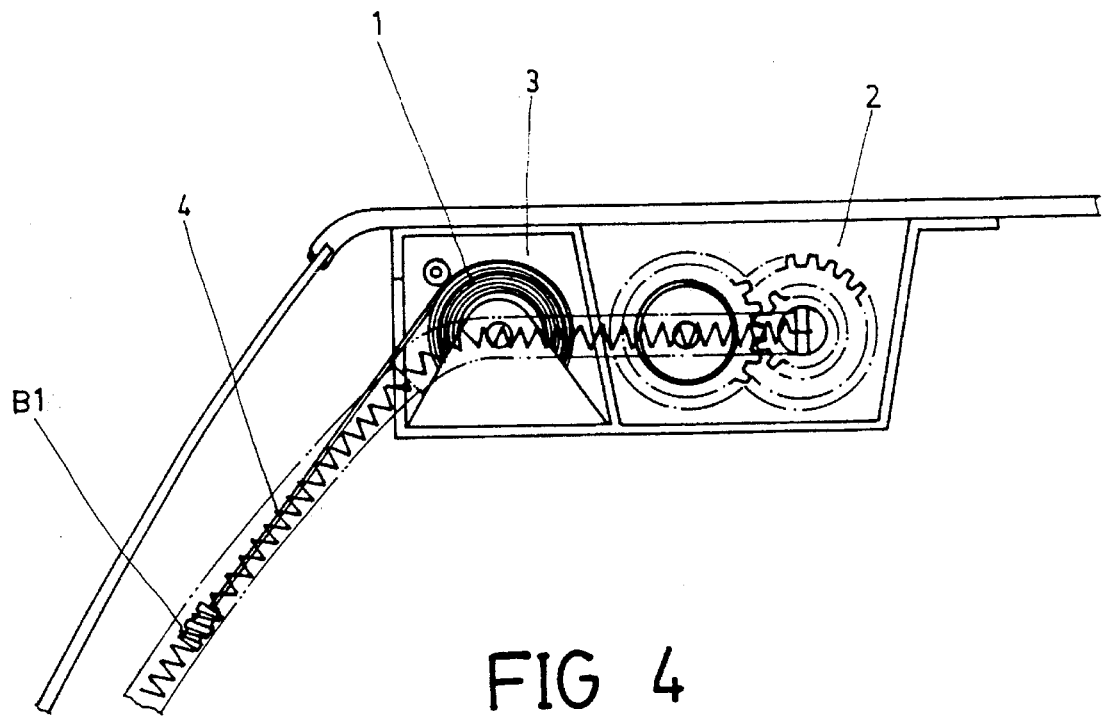
FIG. 4 is a side view of the structure in this invention.
Figure 5:
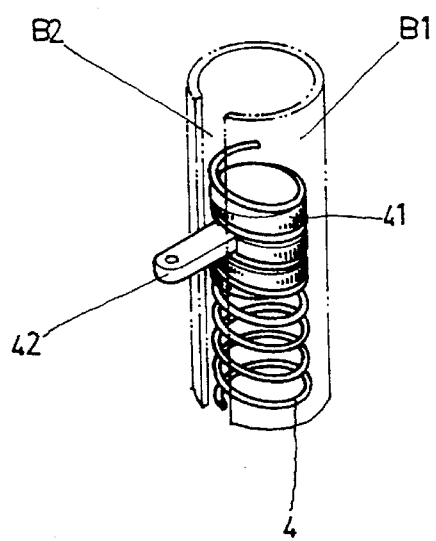
FIG. 5 is a perspective view of the spring located inside the guiding pipe of the invention.
Figure 11:
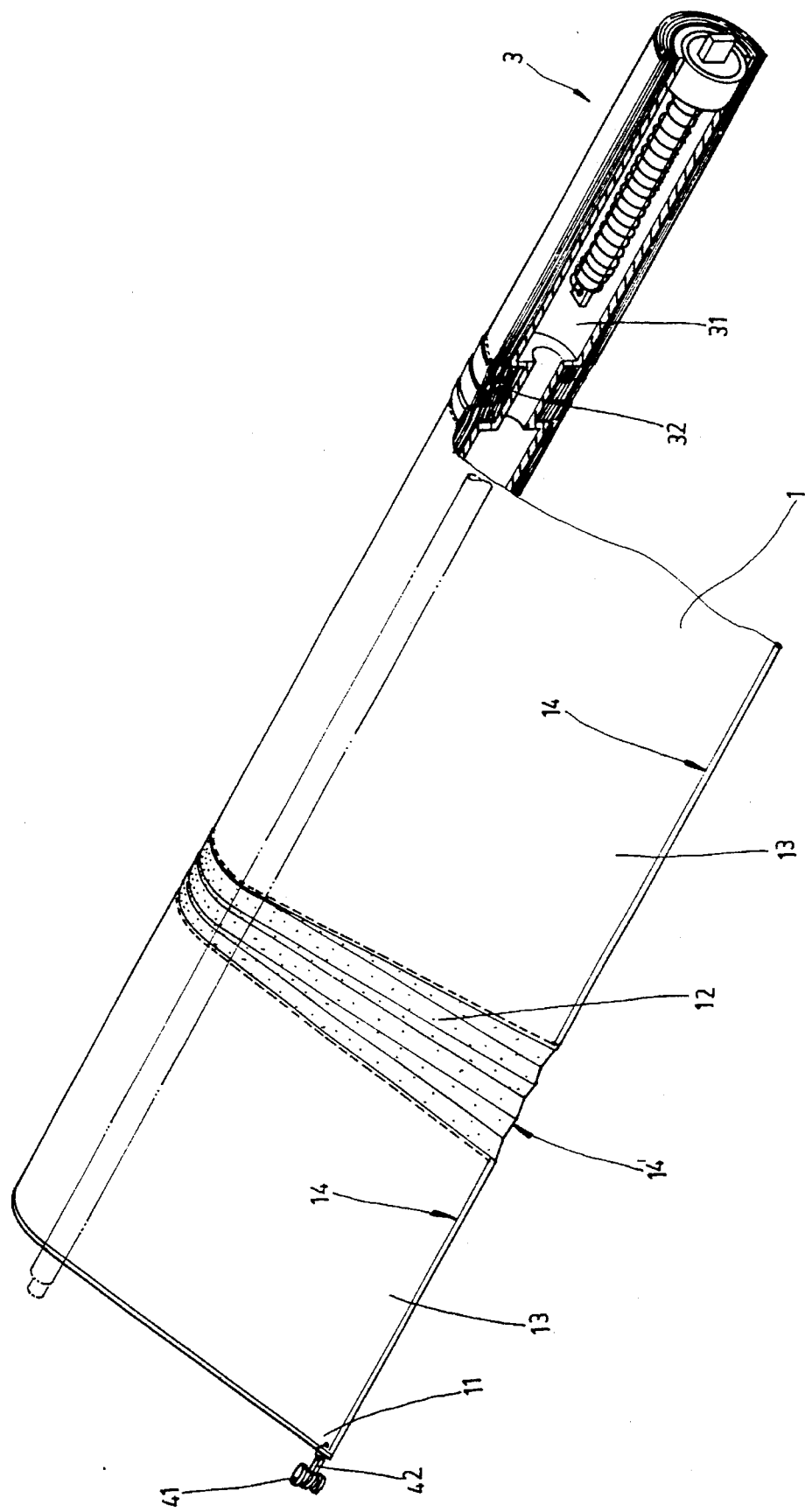
FIG. 11 is a perspective view of the furling casing of the invention.

A main feature of this invention is the device used to drive the spring (4). Most motor vehicles have a curved shape from the crossbeam (A) to the side rack (B), so the object of driving stably is achieved in accordance with the invention by the features of softness and flexibility of the spring (4). A driving axle (27)is connected with the springs (4) on both sides and extends outside the power casing (2), such that the springs rotate synchronously with the driving axle (27). Furthermore, the spiral orientation of the two springs (4) are opposite to each other for causing the two springs to roll in the same direction, either upward or downward simultaneously, when the driving axle (27) rotates. As shown in FIG. 4, each spring (4) extends downwards to the end of a respective side rack from the power casing (2) through the furling casing (3) and the sliding track (B1) of the side rack (B). Three construction types for the sliding track (B1) are described later, but according to each construction, the sliding track (B1) is formed inside the two opposite side racks (B) with two symmetric apertures (B2) (See FIG. 5). A link block (41) is engaged inside the spring (4). The number of cycles or loops of the spring that are occupied by the link block (41) is not limited since the basic requirement is to prevent the link block (41) from falling off. A link stick (42) formed on the link block (41) extends outside the spring and through the aperture (B2). The link sticks (42) are connected with both ends of the bottom of the windshield curtain (1) so that the bottom of the windshield curtain (1) is pulled laterally outwardly at the side racks (B). The link stick (42) is limited by the aperture (B2), so rotation of the springs (4) forces the link sticks (42) to move upwards and downwards in the sliding track (B1) with the link block (41). That means, the windshield curtain (1) is driven to move upwards and downwards. Of course, the other force for taking up the windshield curtain (1) is provided from within the elastic furling structure in the furling casing (3), as shown in FIG. 11 and further discussed hereinafter, so as to furl the windshield curtain (1) into a cylindrical shape tightly, as shown in FIG. 4, and such a method only needs a small space and provides a good furling effect.

Moreover, the sliding track (B1) in the side rack (B) defines the inner space of the hollow metal of the side rack (B) which can be used to extend the spring (4), and a guiding pipe (43)is arranged in the sliding track (B1) for decreasing the noise while increasing the smoothness of the sliding movement. The guiding pipe (43) is preferably formed of a plastic material and covers the spring (4) from the power casing (2). On the other hand, a pipe composed of many sections engaged with each other can conform to the curvature between the crossbeam (A) and the side rack (B). In other words, taking the guiding pipe (43) as the outer layer of the spring (4) with the link stick (42) extending outside the spring (4) to connect with the windshield curtain (1), a symmetric aperture with that of the sliding track (B1) is formed on the wall of the guiding pipe (43) from the furling casing (3) to the end of the sliding track. Furthermore, the guiding pipe (43) extends from the crossbeam into the side rack.

Figure 6:
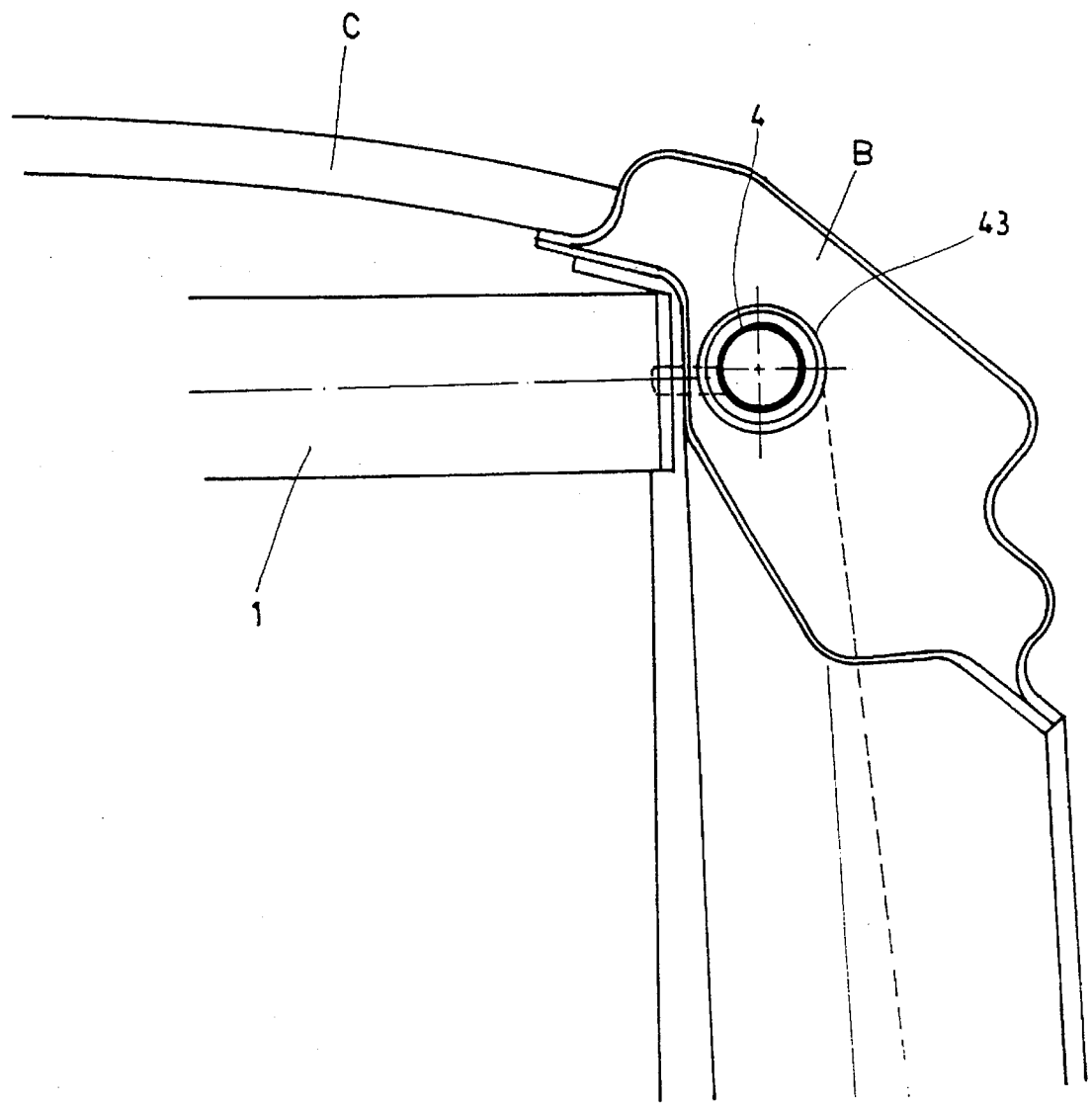
FIG. 6 is a diagram indicating the spring located inside the side rack of the invention.
Figure 7:
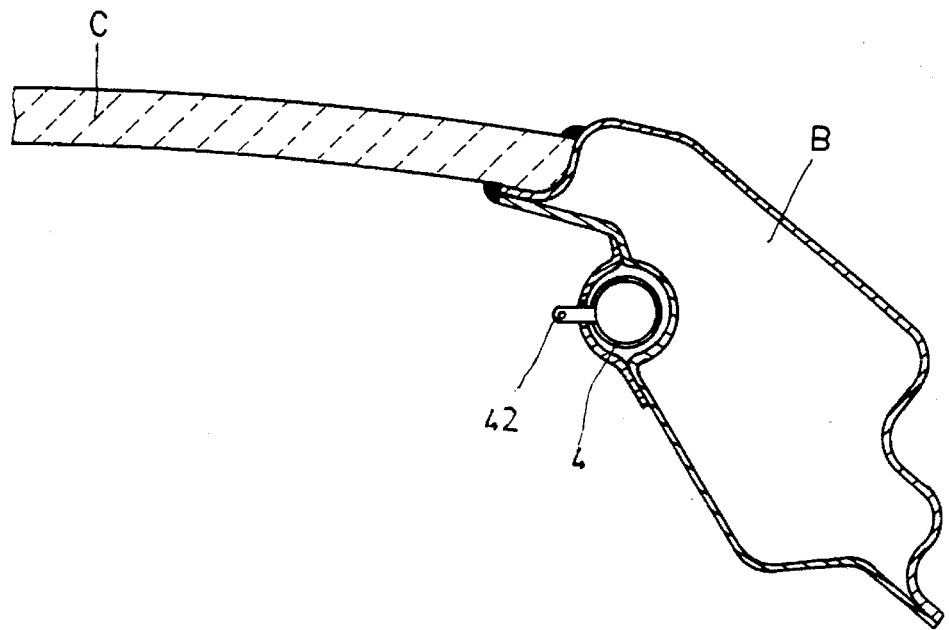
FIG. 7 is a diagram of an alternative embodiment wherein the spring is located on the edge of the side rack.
Figure 8:
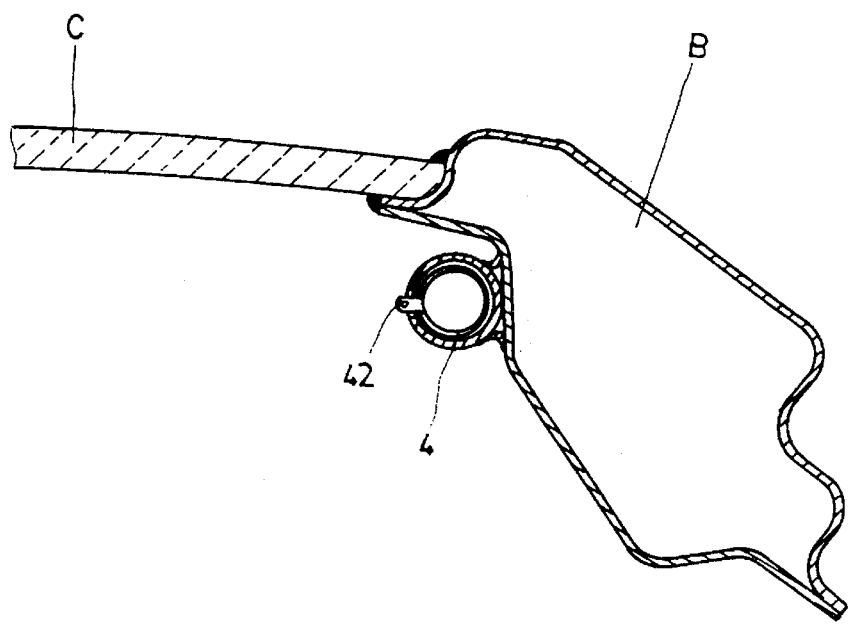
FIG. 8 is a diagram of another variant of the arrangement shown in FIG. 7.
Figure 9:
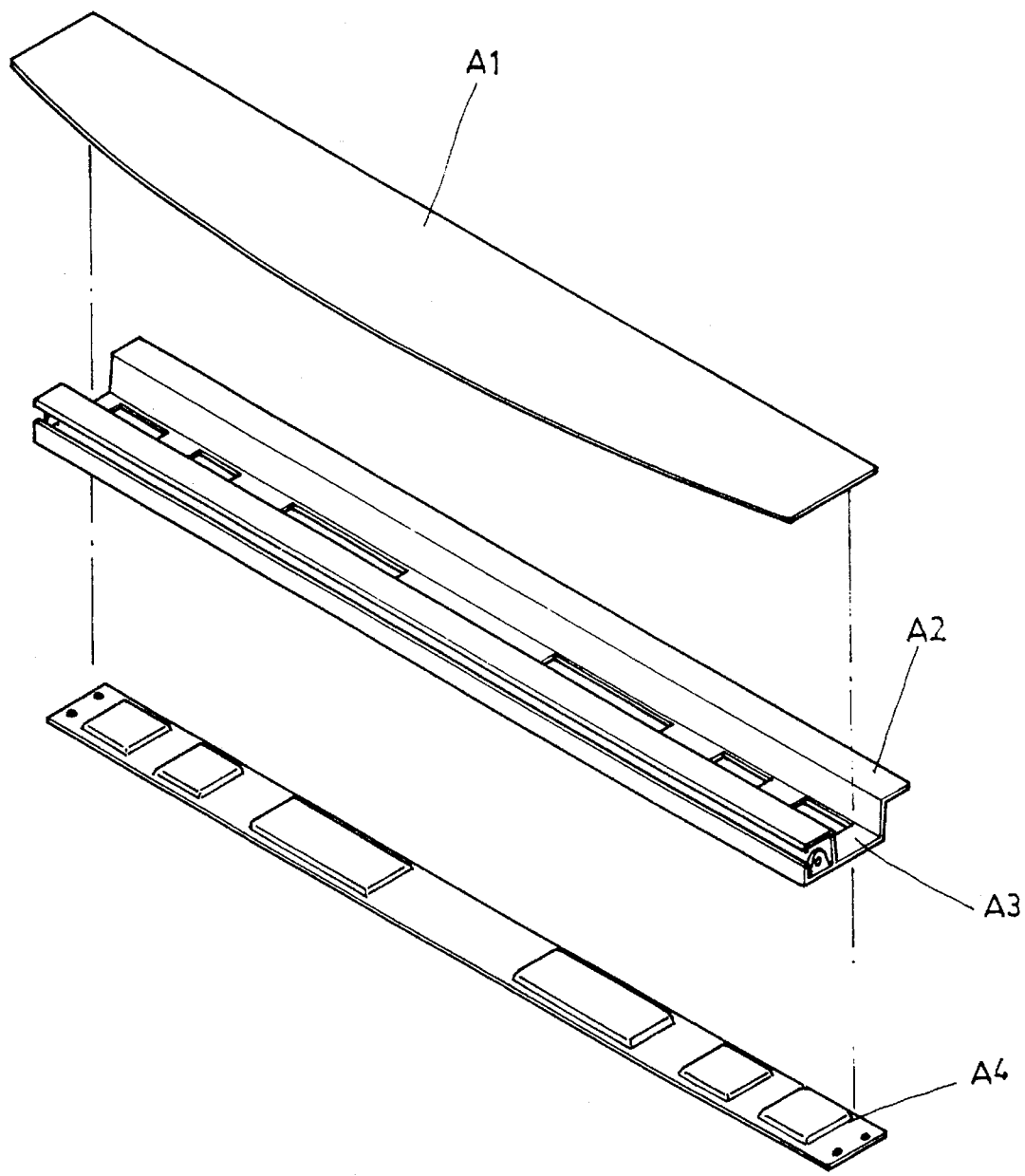
FIG. 9 is a perspective view of the crossbeam assembly in this invention.

Three types of such a design are discussed below for matching the structure of the motor vehicle: firstly, inserting the guiding pipe (43)into the hollow side rack directly, as shown in FIG. 6; secondly, designing the side rack (B) into a U groove and connecting it with the other shell which is a U groove to form a cylindrical pipe for inserting the guiding pipe (43) as shown in FIG. 7; thirdly, keeping the design of the side rack only providing an D shell on the side thereof to form a cylindrical pipe for containing the guiding pipe (43) and the spring (4) as shown in FIG. 8.

FIGS. 8 and 10 illustrate embodiments of crossbeam (A) that includes the upper plate (A1), the metal crossbeam (A2), the bottom of the crossbeam (A3) and the bottom plate (A4). The holes on the bottom of the crossbeam (A3) can be formed by a convex edge, wherein the holes provide the paths for arranging or fixing the guiding pipe (43), the spring, the motor (21), etc., such that the construction is easy and the above-described function is performed completely. After the construction of the components has been accomplished, the bottom plate (A4) is pushed upwards and tightly engages with the bottom of the crossbeam (A3), so not only is the construction stable and easy, but also the appearance thereof is beautiful. Thus, the aforedescribed features indicate that the internal decoration of the motor vehicle is not destroyed by the arrangement of the invention.

As illustrated in FIG. 11, a rolling tube (31) with an elastic furling structure is installed in the furling casing (3). The spring used for furling the curtain is loaded into a state of pulling back the curtain when the curtain (1) is pulled and extends downwards, so the elastic force can be used to stably and smoothly furl the curtain (1) into the rolling tube (31). A detailed description is unnecessary for this arrangement as it represents common elastic structure. The curtain (1) is taken up or unreeled by the connection of the link stick (42) on the link block (41) and the two ends of the bottom of the curtain (1). Since the front window of the motor vehicle has a curvature and is smaller on the upper portion and larger on the bottom, the curtain (1) must provide an area of folds which expand when moving downwards in order to achieve a good shielding effect. In other words, both the elastic area (12) and the inelastic area (13) are formed on the curtain (1). The elastic area (12) is full of folds, and a pulling line (14) is connected between the two ends of the bottom of the curtain. The pulling line (14) is divided into two sections, a novelistic section which is on the inelastic area (13) and the elastic section which is on the elastic area (12). The folds in elastic area (12) are expanded when the curtain (1) is pulled and return to their original state when the pulling force is over. Moreover, the thickness of the area of the folds on the curtain is thicker so a concave part (32) is installed in respective positions along the rolling tube (31) in the furling casing (3). Two elastic areas (12) are enough for the whole curtain (1), so two concave parts (32) are formed to contain the thicker area for furling the curtain stably and smoothly.

I claim:

1. A windshield curtain structure for selectively covering a front window of a motor vehicle having a crossbeam located at a front roof portion of the motor vehicle, said windshield curtain structure comprising:

a furling casing;

a power casing, said furling casing and said power casing being attached to the crossbeam at the front roof portion of the motor vehicle;

a motor mounted in said power casing;

a transversely extending axle rotatably mounted within said power casing, said axle having first and second ends extending out opposing lateral sides of said power casing;

means for drivingly interconnecting said motor to said axle such that activation of said motor causes said axle to rotate;

first and second hollow side racks each of which extends along a respective side of the front window, each of said side racks being provided with a first elongated aperture;

first and second plastic guiding pipes, each of said guiding pipes extending from the crossbeam along a respective said side rack and including a second elongated aperture aligned with a respective said first elongated aperture;

first and second springs each including multiple spiral sections with the spiral sections of said second spring being orientated opposite to the spiral sections of said first spring, said first and second springs being positioned in said first and second guide pipes respectively, each of said first and second springs having one end portion attached to a respective one of the first and second ends of said axle;

first and second line blocks each of which has a length greater than a distance spanned by at least two of said spiral sections and is positioned inside a respective one of said first and second springs;

first and second link sticks each of which is attached to a respective one of said first and second link blocks and projects through a respective aligned pair of said first and second elongated apertures; and a windshield curtain adapted to be reeled within said furling casing, said windshield curtain including a bottom that is attached to said first and second link sticks, wherein operation of said motor causes rotation of said axle, spiralling of said springs, shifting of said link blocks and movements of said windshield curtain through said link sticks.

2. The windshield curtain structure according to claim 1, wherein said guiding pipes extend directly within said hollow side racks.

3. The windshield curtain structure according to claim 1, wherein said side racks are formed with respective outer grooves that are generally U-shaped in cross-section, each of said guiding pipes extending within a respective one of said grooves.

4. The windshield curtain structure according to claim 1, wherein said guiding pipes are attached to outer surfaces of said side racks.

* * * * *

UNITED STATES PATENT AND TRADEMARK OFFICE
CERTIFICATE OF CORRECTION

PATENT NO. : 5,551,744
DATED : September 3, 1996
INVENTOR(S) : Chuen-Rong LIAO

It is certified that error appears in the above-identified patent and that said Letters Patent is hereby corrected as shown below: On the title page:

On the title page, item [73], delete both lines in it's entirety.

Attorney, Agent, or Firm - change "Pennie & Edmonds" to --Bacon & Thomas--

Signed and Sealed this

Twenty-fourth Day of March, 1998

*Attest:*

BRUCE LEHMAN

*Attesting Officer*     *Commissioner of Patents and Trademarks*